June 29, 1965 E. G. NASSIMBENE 3,192,321

ELECTRONIC LIP READER

Filed Dec. 14, 1961 3 Sheets-Sheet 1

INVENTOR.
ERNIE G. NASSIMBENE
BY John J. McCormack

June 29, 1965 E. G. NASSIMBENE 3,192,321

ELECTRONIC LIP READER

Filed Dec. 14, 1961 3 Sheets-Sheet 2

June 29, 1965 E. G. NASSIMBENE 3,192,321

ELECTRONIC LIP READER

Filed Dec. 14, 1961

3 Sheets-Sheet 3

3,192,321
ELECTRONIC LIP READER
Ernie G. Nassimbene, San Jose, Calif., assignor to International Business Machines Corporation, New York, N.Y., a corporation of New York
Filed Dec. 14, 1961, Ser. No. 159,377
4 Claims. (Cl. 179—1)

This invention relates to a device for measuring the reflectivity of the human face regions, and more particularly, to a device for determining the position of the facial parts during speech as an adjunct to voice recognition.

In the burgeoning voice recognition art, many problems have presented themselves. One of the most baffling of these problems is that of similar sounding syllables, which are undetectable by the acoustic means conventionally used in voice reading machines, such as microphones. The problem of similar sounding syllables involves such sounds as m and n, d and b, t and d, and the like wherein the sounds are acoustically the same or very similar, but are formed by different positioning of the lips and teeth. This problem is compounded by the further problem of identifying sounds consistently despite the fact they are enunciated differently by many different speakers. Voice reading machines are in need of a lip reading adjunct in the same manner that a deaf person hearing sounds in a vague, or distorted fashion, needs to read the lips to completely determine the sound enunciated. Moreover, many voice reading machines are purposely made simple and inexpensive so as to be easy and practical to operate. This requires a minimum of discriminating apparatus in the machine and places a premium on the quick discrimination of enunciated syllables. Therefore, many simple voice reading machines are necessarily inexact. The instant invention would supplement their accuracy without substantially increasing their complexity or cost. Further, the instant invention may, on its own, fully ascertain certain syllables merely by its reflectivity measurements. Such syllables would be the "00" sound. Such a sound could be completely recognized by placing the source of energy and energy senser directly in front of the normally closed position of the lips and allowing it to be interpreted on the enunciation of the "00" sound.

A further use for the instant invention would be in an environment possessing a high degree of background noise, as for example, in a factory, or on a missile launch pad. In such a noisy environment, the acoustic signal emanating from the speaker's mouth might be radically distorted or even suppressed. In the event of such an occurrence, the instant optically sensitive device would still carry a speech recognizing signal and maintain the operability of the voice recognition system.

It is therefore an object of the present invention to provide a machine which can detect the position of the lips and teeth during speech.

Another object is to provide a lip reader supplementary to voice reading machines.

A further object is to provide a simple and inexpensive complement to voice reading machines so as to improve their accuracy easily. Yet a further object is to provide a machine system for measuring the reflectivity of the oral regions.

Another object is to provide a means for discriminating between similar sounding syllables in the voice reading art.

Yet another object is to provide a lip reading machine using radiation reflectivity measurements.

Systems in accordance with the present invention have many different aspects and represent a novel approach to the problems of sound and speech recognition. Essentially, what the invention measures is the reflectivity from a surface, in this application, the surface of the oral cavity. This is done by directing radiant energy against the oral region and measuring by a radiation senser, the amount reflected therefrom, so as to determine the condition of the lips and teeth. Such a system of radiant energy lip reading, when combined with an acoustic voice reading system, is a direct analog of the mechanism whereby a deaf person supplements his poor or inexact acoustical sensing means by means of reading the speaker's lips.

The foregoing and other objects, features and advantages of the invention will be apparent from the following more particular description of a preferred embodiment of the invention, as illustrated in the accompanying drawings, wherein.

Figure 1:
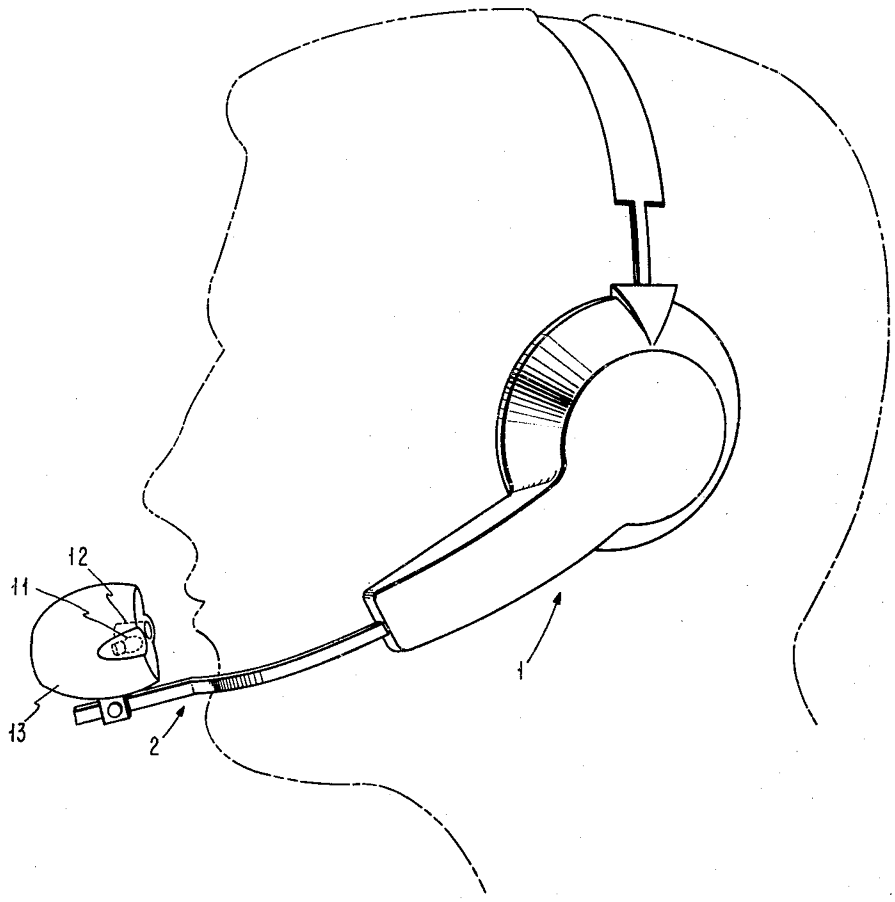
FIG. 1 is a pictorial representation of the invention as used by an operator.
Figure 2:
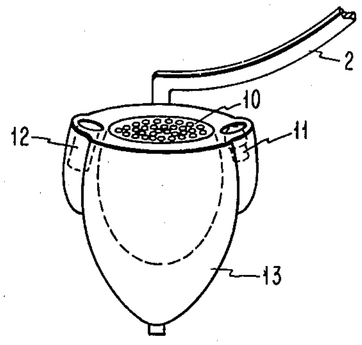
FIG. 2 is a top view section of the invention as combined in a microphone case.

In the embodiment in FIG. 1, the invention assumes the form of a source light 11 which is mounted in a microphone case 13 in combination with a microphone 10 and arranged so as to direct its light against the mouth region of the speaker shown in the figure so as to provide a measure of reflected light according to the position of the lips and teeth at the mounting position of photocell 12. FIG. 2 shows this in section. This microphone case 13 is shown as mounted from a conventional headset 1 by an adjustable support arm 2. The distance from the mouth necessary to produce a sensitive output at the photocell may be adjusted by means of the adjustable arm 2. This adjustment should not significantly affect the response of the microphone operating within its radius of response. However, the sensitivity of the microphone may be adjusted to compensate for any loss in response caused by adjusting the photocell distance. The reflectance output from the photocell 12 may be conveyed along the support arm 2 to the headset 1 in the manner of the microphone output. The power supply and voice reader output leads to and from the headset used for the microphone are merely duplicated in the case of the light and photocell voltage supplies and output signal.

Figure 3:
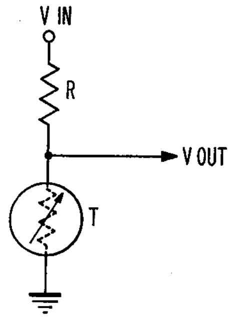
FIG. 3 is a schematic representation of the circuit associated with the invention in FIG. 1.

In FIG. 3 there is shown the schematic circuit suitable for measuring the output from the lip reader illustrated in FIG. 1. Here, a suitable voltage $V_{In}$ is impressed through load resistor R across photo resistor T and thence to ground. The amount of sensitizing radiation falling upon photo resistor T would be measured according to its loss in resistivity. Hence, the current through resistor R will vary causing a voltage output $V_{Out}$ to the detector which will in turn vary according to the amount of sensitizing radiation incidents upon photo resistor T. Thus, the change in voltage output to the detector may be standardized as an indication of lip attitude for a particular person, and at present radiating conditions, to correspond to a given set of reflectivity conditions, namely, closed lips, open lips and open teeth.

Figure 4:
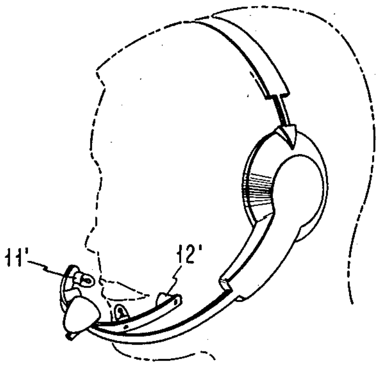
FIG. 4 is the same as FIG. 1 with an added photocell sensor combination used as an interrupter.
Figure 5:
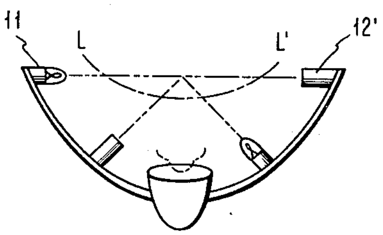
FIG. 5 is a schematic representation of the operation of the combination in FIG. 4.

In FIG. 4 there is shown a variation on the mechanism in FIG. 1. Here, the lip reading device of FIG. 1 is supplemented by a secondary photocell in combination with its own separate light source 11' and separate photocell 12' to detect the opening and/or puckering of the lips. This might be categorized as a "pucker" meter, since this arrangement gives further lip reading information when positioned so that its beam is interrupted when the "pucker" sounds such as "00" are enunciated. As shown in the top view in FIG. 5, the light path is interrupted when the lips, outlined by line L–L', are closed. When the mouth is open fully, however, full light is passed. Similarly, when a "pucker" sound is to be detected, the light beam in the "pucker" meter would be interrupted even though the principal photocell would indicate a partially open mouth cavity. This information may be used to supplement the principal lip reading combination or to, itself, identify syllables uniquely characterized by this "pucker" movement.

Figure 6:
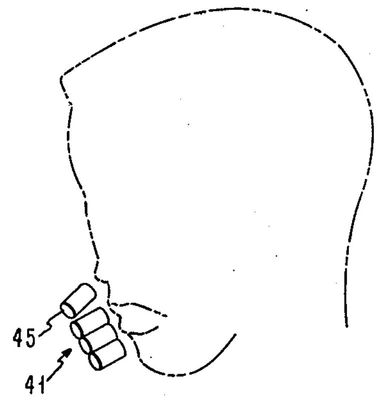
FIG. 6 is a pictorial representation of a modification of the invention wherein a plurality of lip reading cells are used in combination with a reference cell.
Figure 8:
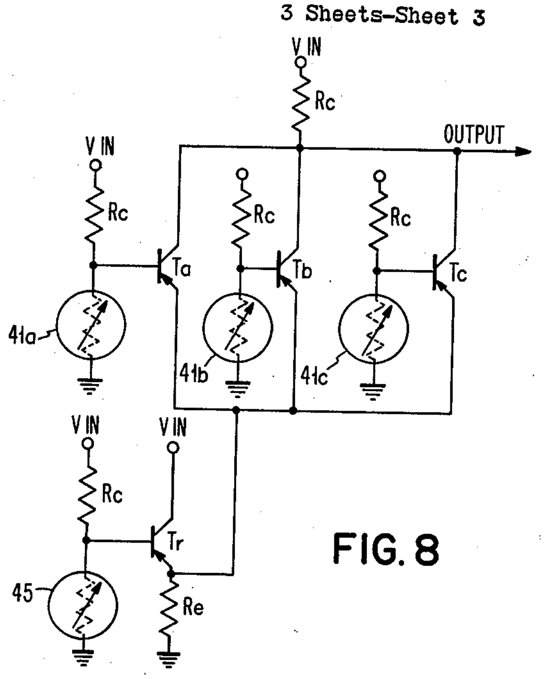
FIG. 8 is a schematic representation of an electrical circuit suitable for use with the combination shown in FIG. 6.
Figure 7:
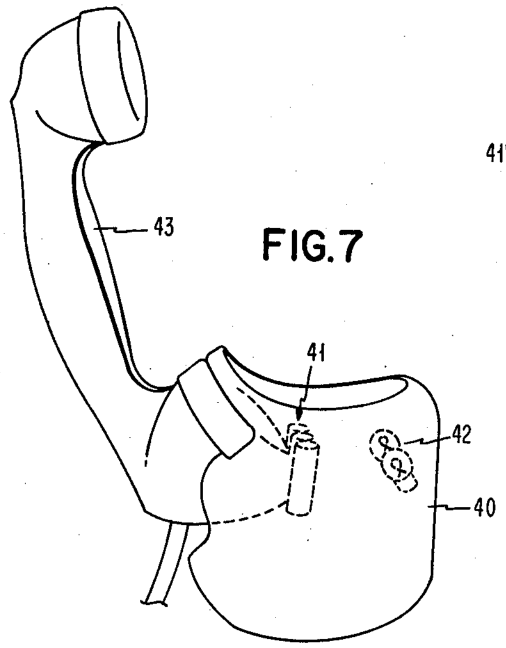
FIG. 7 illustrates a headset suitable for mounting the combination in FIG. 6.

In FIG. 6 there is illustrated a variation of the combination shown in FIG. 1 wherein a multiplicity of sensing photocells is used in order to cover a greater area of the mouth region. This feature eliminates the height-reference criticality, making it unnecessary for any fine adjustment in keeping the source light aimed always at the mouth. There is a possible problem of light "noise" deriving from changes in the ambient light from time to time and from location to location using any given lip reader set. In the hand set illustrated in FIG. 4, this problem was eliminated by the use of a "hush-a-phone" hood over the mouthpiece which fits very near to the mouth and serves as a mounting means for the bank of photocells 41 used, as well as the light sources 42. This hood 40 is mounted upon a normal telephone-type microphone hand set 43. Changes in ambient light can also be compensated for by the use of a reference cell 45 such as shown in FIG. 6, along with the accompanying compensating circuit as shown in FIG. 8. This reference cell "looks" at a nonmovable, static portion of the face during speech. Thus, the reference cell receives a constant amount of light under constant ambient conditions and will change in output according to the change in ambient light only, since it is not sensing any movement of the enunciating portion of the mouth.

In the typical compensating circuit, shown in FIG. 8, when a variation in ambient illumination occurs, as for example of sunlight through a nearby window, the bank of "lip-reading" cells and the reference cell will change in resistance the same amount whenever there is a change in ambient light falling upon the person's face. Thus, the base voltage, and thus the emitted voltage of each reading cell's amplifying transistor $T_a$, $T_b$, and $T_c$ will change an equal amount resulting in no net output current flow and a constant stabilized output to the detector. Thus, the reference cell and compensating circuit will provide a standard reference for ambient light conditions.

If, when an ambient light change occurs, the base to emitter voltage $V_{BE}$ of $41'_{a,\ b,\ \text{and}\ c}$ could be made to remain unchanged, no change in current would flow through the transistors $T_{a,\ b,\ c}$ and, therefore, no voltage change would occur at the output. This stabilization is achieved by the reference cell. When an ambient light change occurs, the base voltage on all the transistors $T_a$, $T_b$, $T_c$ and $T_r$ change the same amount. However, when the base of transistor $T_r$ is changed a corresponding voltage change across $R_e$ results. Since the emitter resistor $R_e$ is common to all of the lip reading transistors $T_a$, $T_b$, $T_c$, their emitter voltage has been raised the same amount as their base voltage. Thus, no change is observed at the output.

Figure 9:
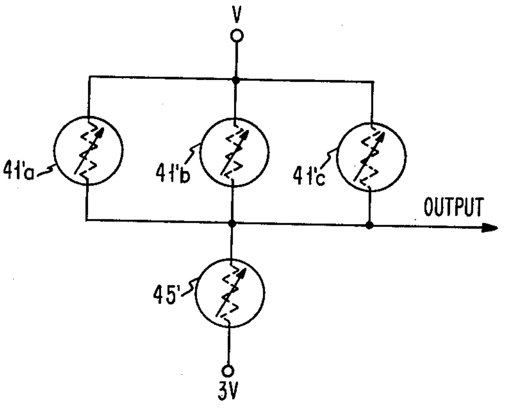
FIG. 9 shows an alternative circuit for use with the combination shown in FIG. 6.

FIG. 9 illustrates an alternative and somewhat simpler compensating circuit. Here, when the reference photocell 45' "sees" a constant light source, it will have a constant resistance and thus changes in the resistances of the lip reading photocell $41'_{a,\ b\ \text{and}\ c}$ will result in voltage changes at the output. However, if an ambient light change occurs, all the photocells will change resistance by substantially the same amount. Since the voltage supply on the reference cell 45' is the opposite polarity of the lip reader cells $41'_{a,\ b\ \text{and}\ c}$, the resulting output voltage is unchanged.

In summary, the operation of the invention, as generally shown in FIG. 1, for example, is as follows: a light source is directed at the speaker's mouth and the amount reflected is detected by a suitable photo-resistor as a function of its resistance. Thus, changes in the reflecting surface are detected. When the speaker's lips are closed, the reflecting surface will be the skin surface reflecting a maximum amount of light. When the lips are open and the teeth are closed, the teeth surfaces will be the reflecting surface and a moderate amount of light reflected to the photocell. Finally, when both the lips and teeth are fully open, the reflecting surface will substantially disappear and minimum light reflected, there being the open cavity of the mouth into which the source light is directed. Hence, it is apparent that these three radically different reflecting surfaces will produce three radically different optical inputs at the photoresistor and accordingly three radically different electrical outputs at the detector, which may be displayed as an indication of mouth attitude in a speech recognition system.

A method for analyzing speech in accordance with the present invention may be seen to involve projecting radiant energy upon the mouth region of a speaker, measuring that portion reflected and displaying the measurement to indicate the position of the lips and teeth. In the instant case, the measuring is accomplished by a photo resistor whose resistance decreases with an increase in incident light energy. Since the quantum of incident light is a function of surface reflectivity given a constant light source, the photoresistor output indicates reflectivity and, thus, shifts of reflecting surfaces. Combining the output from such a photocell with the acoustical output of a conventional microphone voice reader, one can distinguish similar sounding syllables according to their differences in lip or teeth positioning. Such syllables are indistinguishable to present acoustic speech recognition systems. Thus, syllables may be identified by a process of lip reading.

It will be recognized that the systems and methods according to the invention may be widely varied. They may assist voice recognition machines to identify otherwise confusing syllables. They may identify syllables themselves, operating as optical voice readers as opposed to the present acoustic voice recognition devices characterizing the prior art. Such optical sensing obviates such problems as ambient noise (e.g., office hubbub) inherent in acoustic sensing.

Although there have been described above and illustrated in the drawings various systems and methods for analyzing sound and recognizing the spoken word in accordance with the invention, it will be apparent that various elements and steps may be modified or completely supplanted by the use or substitution of other known elements to their relationships. Accordingly, the invention should be considered to include all modifications, variations, and alternative forms falling within the scope of the attendant claims.

While the invention has been particularly shown and described with reference to a preferred embodiment thereof, it will be understood by those skilled in the art that various changes in form and details may be made therein without departing from the spirit and scope of the invention.

I claim:

1. In a voice recogniiton system, the combination comprising a microphone of conventional type, a case enclosing said microphone, illuminating means mounted in said case so as to irradiate the wearer of said case supporting said microphone, a detecting means also mounted in said case, and positioned so as to receive radiation reflected from the mouth of said wearer, output leads from said microphone and said detecting means leading and conveying the signals therefrom to a voice reading system and input leads for supplying a source of energy to said microphone, said detecting means, and said illuminating means.

2. The combination as recited in claim 1 wherein said illuminating means includes an auxiliary source of light mounted beside the mouth of the said wearer and said detecting means includes an auxiliary photocell mounted beside the mouth of said wearer opposite of said source so as to receive light therefrom when the speaker's mouth is in a fully open position.

3. In an electronic lip reader, the combination comprising:

a light source arranged to irradiate the oral region of the face;

light sensing means disposed to detect the amount of energy from said source reflected by said oral region, said means including photoresistor means;

conventional transducing means, said means including a conventional heat set, a microphone, and adjustable mounting means attached to said set to support said microphone in adjustable proximity to a speaker's lips;

housing means for mounting and fixing the relationship of said microphone, said photoresistor and said light source;

supply energy input means for energizing said sound transducing microphone means, said radiant energy source and said sensing transducer; and output means for conveying electrical signals from said microphone means and from said photoresistor to speech analyzing means whereby to identify components of human speech.

4. In an electronic voice reader, the combination comprising sound transducing means; a source of radiant energy arranged to irradiate the oral region of the face, said radiant energy source including a frontal source arranged to irradiate the mouth of said speaker and a lateral source positioned beside the mouth of said speaker; radiant energy sensing means disposed to detect the amount of energy from said source reflected by said oral region, said radiant energy sensing means including a frontal transducer arranged to receive and be energized by the radiant energy reflected from the mouth of said speaker and a lateral transducer positioned beside the mouth of said speaker opposite said lateral source so as to be irradiated thereby only when the mouth of said speaker is fully opened; supply energy input means for energizing said sound transducing means, said radiant energy source and said sensing means; and output means for conveying electrical signals from said sound transducing means and from said radiant energy sensing means to apparatus for identifying components of human speech.

References Cited by the Examiner

"Television," by Zworkin et al., 2d ed., Wiley and Sons; 1954, page 963.

ROBERT H. ROSE, *Primary Examiner.*